Patented Aug. 22, 1950

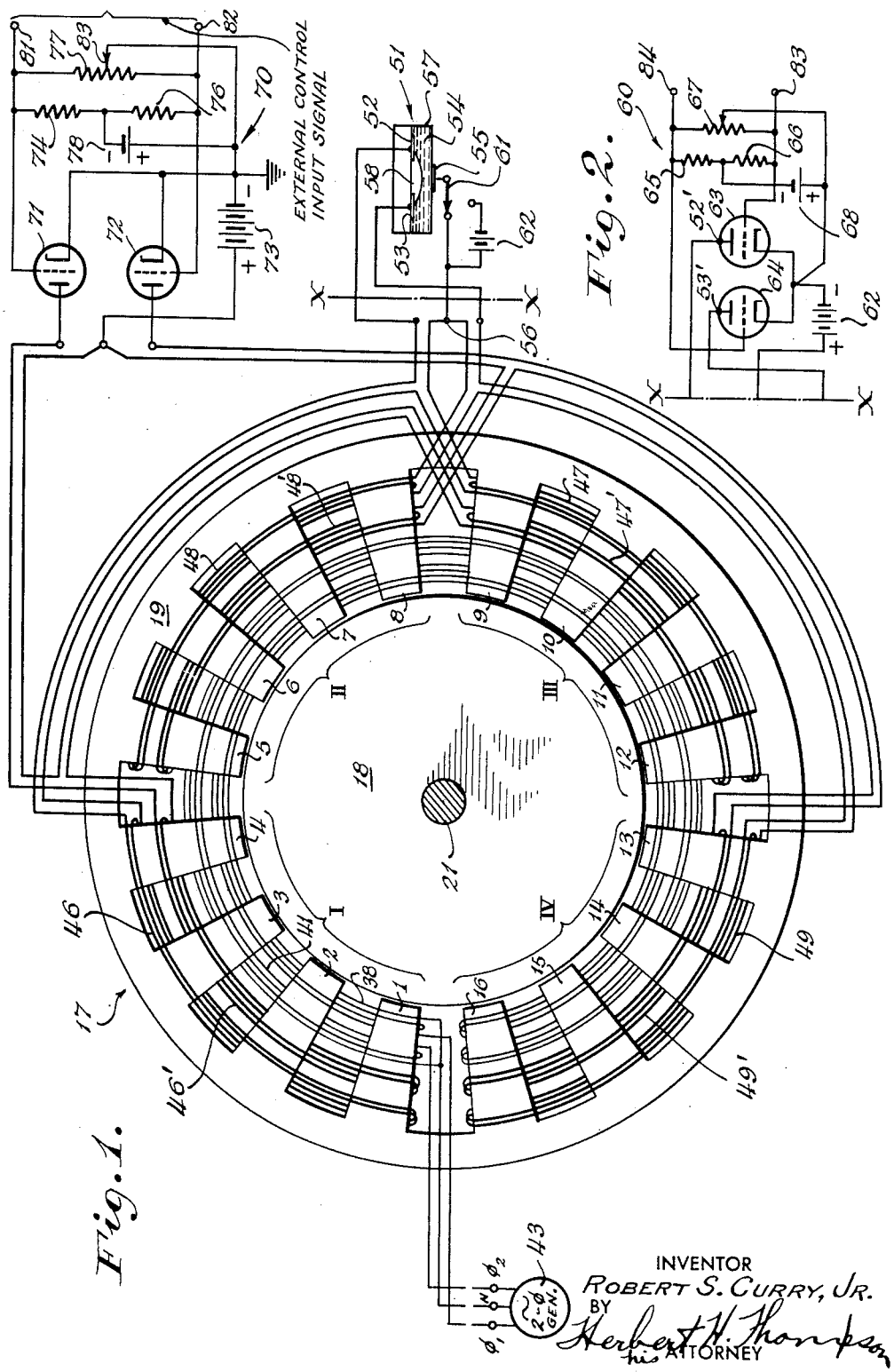

2,519,356

UNITED STATES PATENT OFFICE 2,519,356

REVERSIBLE ALTERNATING CURRENT ELECTROMOTIVE APPARATUS

Robert S. Curry, Jr., Baldwin, N. Y., assignor to The Sperry Corporation, a corporation of Delaware Application March 29, 1946, Serial No. 658,027

13 Claims. (Cl. 318—207)

1

The present invention relates to electromotive apparatus, and especially to reversibly controllable electric motors, including electric torque motors suited for controlling the orientation of a gyroscope.

According to the prior art, electric motors usually have been controlled by selective energization of one or more motor power input windings, or by providing a phase-reversing or polarity-reversing switch connected in the input power supply circuit of a motor power input winding. Such control circuits have heretofore been used not only for normally rotating motors, but also for motors employed in stalled condition for producing a torque, the latter being usually referred to as "torque motors."

Making and breaking the main power supply circuits of an electric motor is a disadvantageous method of motor control, in several respects. At the outset, both the current capacity and the voltage capacity of the switching device must be relatively high. This is particularly important where the motor stator and rotor units are attached to two relatively movable parts of a Cardan suspension of a gyroscope, for applying controllable torques about one of the gimbal journal axes thereof, and the torque motor energy supply terminals are connected to a control device attached to the rotor bearing gimbal or rotor housing, the circuits being completed through slip rings and brushes at the intervening gimbal journals. Moreover, if smooth or gradual control of the motor torque is required, rather than an on-off type of control, it is often necessary to provide large variable resistors capable of dissipating appreciable energy, resulting in greatly increased loss of power external of the electromotive apparatus, and a further loss in torque due to the change in phase angle between the two primary flux fields as a result of the change in circuit impedance.

An object of the present invention is to provide electromotive apparatus characterized by simplified control circuits and control apparatus, and capable of smooth and gradual, wide range reversible control with minimized power loss.

A further object is to provide improved electromotive apparatus readily adapted to be controlled by variations of output current of a control amplifier.

The invention in another of its aspects relates to novel features of the instrumentalities described herein for achieving the principal objects of the invention and to novel principles employed in those instrumentalities, whether or not these features and principles are used for the said principal objects or in the said field.

2

A further object of the invention is to provide improved apparatus and instrumentalities embodying novel features and principles, adapted for use in realizing the above objects and also adapted for use in other fields.

In accordance with an important feature of the present invention, gradual and reversible control is provided in electromotive apparatus by the arrangement therein of windings in sector portions, in such a way that the force developed in one sector of the apparatus—a torque in the case of rotary electromotive apparatus—is in a first direction, while the force or torque developed in another sector of the apparatus is in the opposite direction. Auxiliary windings are provided in these sectors and connected to control devices, in such a way that the resultant force produced in the apparatus may be controlled by variation of current through the auxiliary windings.

The foregoing objects and general description of the present invention will be made clear, and further objects will become apparent, from the following detailed description taken in connection with the accompanying drawing, wherein Fig. 1 illustrates electromotive apparatus constructed in accordance with a preferred embodiment of the present invention, and Fig. 2 illustrates a modified embodiment of the invention.

Referring now to Fig. 1, there is shown an electromotive device 17 comprising a rotor 18 and a stator 19. The rotor 18 may include a central shaft 21 which may be supported in bearings for rotation relative to the stator 19. The rotor 18 may be formed of a current-conducting material, such as aluminum, for example. The stator 19 may comprise a stack of relatively thin permeable laminations, uniformly stamped according to a regular pattern of serrations, such that the stack of stator laminations forms a plurality of permeable teeth, e. g., sixteen teeth, designated 1–16 in clockwise order as viewed in Fig. 1. These teeth are directed toward the rotor, for completion of their magnetic flux paths therethrough. In order to enhance the flux production through the rotor, the latter may contain permeable elements for partially bridging the flux gaps between the ends of the stator teeth.

A first electric energy supply winding 38 is provided for alternating current excitation in a first phase for inducing electromagnetic flux in all of the teeth 1–16. This first winding 38 may be made in the form of a skein sufficiently long to permit of a number of transpositions, and to extend throughout the circumference of the stator 19. Only two complete turns of the winding skein 38 are shown in Fig. 1, but in practice, this winding may comprise any desired number of turns determined according to the operating voltage, as for example, 200 to 1000 turns of a fine-gauge electrical conductor. Winding 38 loops tooth 1 in a first sense, teeth 2 and 3 in the opposite sense, teeth 4 and 5 again in the first sense, and so on around the stator, so that successive pairs of stator teeth are polarized simultaneously as opposite poles of a complete magnetic frame. Thus, when the ends of teeth 16 and 1 are polarized as a north pole, the ends of teeth 2 and 3 are polarized as a south pole, teeth 4 and 5 as a north pole, teeth 6 and 7 as a south pole, and so on around to teeth 14 and 15 which are polarized as a south pole by the action of winding 38. With alternating voltage supplied to this winding, the polarities of all of these magnetic poles are simultaneously reversed at each half cycle of operation of the apparatus.

A second-phase alternating voltage winding 41, which also may be formed as a skein for convenience in manufacture, is arranged to loop teeth 1 and 2 as a pole of a first instantaneous polarity and teeth 3 and 4 as a pole of the opposite instantaneous polarity. With respect to winding 41, teeth 1, 2, 3 and 4 will hereinafter be referred to as comprised by a first sector I of the stator 19. Proceeding onward around the stator 19, the second-phase winding 41 links teeth 5 and 6 as one pole and teeth 7 and 8 as the opposite pole of a second sector II of stator 19; teeth 9 and 10 as one pole and teeth 11 and 12 as the opposite pole of a third sector III; and teeth 13 and 14 as one pole and teeth 15 and 16 as the opposite pole of the fourth sector IV of stator 19. The transpositions in the winding 41 are so arranged that the order of polarities at a selected instant of the second-phase poles in each sector, proceeding in a clockwise direction, are as follows: north-south in the first sector, south-north in the second sector, north-south in the third sector, and finally, south-north in the fourth sector.

Winding 38 is connected to one phase circuit of a polyphase source 43, e. g., a two-phase source, and winding 41 is connected to another phase circuit thereof. The first sector I, including teeth 1-4, having the respective north and south magnetic poles instantaneously produced by the action of winding 41 displaced by one tooth ahead of the respective poles produced by the action of winding 38, produces a clockwise torsional component in the rotor 18. The third sector III of apparatus 17, including teeth 9-12, similarly acts to induce currents in the rotor 18 producing a clockwise torsional component therein. Since the order of the poles excited in the second and fourth sectors II and IV by the action of winding 41 is oppositely sensed, however, these sectors, including teeth 5-8 and teeth 13-16, respectively, produce counterclockwise torsional components in the rotor 18. These torsional components due to sectors II and IV tend to counteract the clockwise torsional forces produced in the rotor 18; and if they are equal to the torsional components produced by the first and third sectors of the stator, the rotor 18 can exert no resultant force on load apparatus connected thereto.

Sectoral control windings 46 and 47 are provided on the teeth of the first and third sectors I and III for controlling the clockwise torque components, and sectoral windings 48 and 49 are provided on the teeth of the second and fourth sectors II and IV for controlling the counter-clockwise torque components. Windings 46 and 47 are connected together, e. g., in series, and windings 48 and 49 are connected together, as in series; and the series-connected pairs of these windings are arranged to be differentially terminated according to the operation of a differentially variable resistance device such as a liquid level switch 51. Such a switch may comprise a pair of contact buttons 52 and 53 connected to the ends of the clockwise and counterclockwise control winding circuits, and arranged to be variably contacted by an electrolytic liquid 54. Within the electrolytic fluid is an immersed common electrode 55, connected to the junction 56 between the clockwise control windings 46, 47 and the counterclockwise control windings 48, 49. Preferably, the electrolyte 54 almost fills the cavity within a dielectric container 57, so that a gaseous bubble 58 is formed to extend over nearly all of the downwardly exposed surface area of the contact buttons 52 and 53.

When the liquid level switch 51 is level, two high-resistance current conduction paths are formed between the common electrode 55 and the buttons 52 and 53. When the switch 51 is minutely tilted, so that one of buttons 52 and 53 is raised to a greater height than the other, the resistance of the path to the higher-level one of the contact buttons is increased, while the resistance of the path through the electrolyte between the other of the contact buttons and the common electrode is greatly decreased. This performance of the liquid level switch 51 results from the electrolyte surging into substantially full contact with the lowermost of the buttons 52 and 53, and leaving the uppermost of the buttons contacted, if at all, only by an extremely thin wetting film of the electrolyte. Such liquid level switches have been employed upon the rotor cases of gyroscopes and connected in the energy supply circuits of gyroscope erection torque motors, as illustrated in U. S. Patent No. 2,381,438, R. S. Curry, Jr., issued August 7, 1945.

Winding 46 loops teeth 1 and 2 in one sense, and is transposed between teeth 2 and 3, to loop teeth 3 and 4 in the opposite sense. Winding 47 similarly loops teeth 9 and 10 in one sense, and teeth 11 and 12 in the opposite sense. By virtue of this arrangement, windings 46 and 47 are closely coupled electromagnetically to the second-phase supply winding 41. Windings 46 and 47 are connected together in such a way that the voltages induced in these windings by winding 41 are added in series-aiding. Similarly, windings 48 and 49 are coupled to the second-phase supply winding 41, and these windings are also connected in series-aiding relation. Accordingly, two substantially equal voltages ordinarily are produced between the common electrode 55 of liquid level switch 51 and the contact buttons 52 and 53, respectively.

Upon departure of the structure from a level orientation, reducing the resistance of the path to the lowermost one of the contact buttons and increasing the resistance of the path to the other, the circuit of the lowermost button carries appreciable current. This circuit, momentarily made highly conductive, decreases the impedance of the portions of winding 41 upon two correspondingly directed sectors, greatly reducing the effectiveness of these sectors. The increase of resistance in the circuit through the electrolyte to the uppermost of the contact buttons renders the control windings associated therewith even less conductive than in their normal condition, and thus renders the other two sectors of the electromotive apparatus 17 effective to produce even greater torque components than the normal torque components during level operation. Accordingly, the electromotive apparatus 17 produces a resultant torque corresponding in direction to the torque components of those sectors whose control windings are terminated for the moment in the higher resistance, i. e., in those control windings included in the reduced-conductivity circuit.

Upon an increase of the current conduction through the control windings extending through a selected pair of cooperating sectors, the effectiveness of these sectors is decreased by the change of impedance induced in the associated sectoral portions of winding 41. If desired, the control of effectiveness due to change of impedance may be augmented by a varying direct current employed for saturation of the permeable teeth within these sectors, reducing the permeability thereof and providing an even further decrease in the effectiveness of the selected sectors. For this purpose, a single-pole, double-throw switch 61 may be provided along with a direct-current source 62, connected in such a way that the blade of switch 61 may be transferred to impart a direct voltage in the common branch of the control winding circuits. By shifting the blade of switch 61 to its lower position, in contact with the terminal connected to the direct-current source 62, the control circuit is made not only to carry out the above function as to change of alternating current impedance of the selected sector portions of winding 41, but in addition, to render even less effective because of magnetic saturation, those selected sectors over which extend the portions of winding 41 having their impedance reduced.

It will be readily apparent from the foregoing discussion that the control circuits 46, 47 and 48, 49 are readily adapted for control not only by such variable resistance apparatus as a liquid level switch 51, but also by an electronic circuit arrangement wherein the differential electronic conduction resistances of a pair of electron discarge devices are inserted in place of the resistance paths between the common electrode 55 and the contact buttons 52 and 53, respectively.

Such a modification of the apparatus of Fig. 1 is illustrated in Fig. 2, the broken lines x—x of Figs. 1 and 2 being used to indicate the extent to which the electromotive apparatus is modified when an electronic control arrangement 60 including a pair of electron discharge devices 63 and 64 is substituted for the liquid level switch 51. The anodes 52' and 53' of devices 63 and 64 are connected to the ends of the control circuits 46, 47 and 48, 49. The cathodes are connected together and to the negative terminal of a direct-current source 62, the positive terminal of the source being connected to the junction 56 of the control circuits. The control electrodes of the electron discharge devices are connected to the ends of a pair of series-connected resistors 65 and 66 having their junction connected to the negative terminal of a direct bias source 68. A potentiometer 67 having its adjustable tap connected to the positive terminal of bias source 68 and to the cathodes of devices 63 and 64 and having its ends connected to the control electrodes may be employed for differentially controlling the space-conduction resistances of devices 63 and 64. When the resistance of one of devices 63 and 64 is reduced and that of the other is increased, the alternating component and the direct component of current through the reduced-resistance device are correspondingly increased, decreasing the effectiveness of the associated sectors of the electromotive device 17 by the cooperating effects of reduction of impedance of the corresponding sector portions of winding 41 and the increased magnetic saturation—and hence decreased permeability—of the teeth of these sectors. Conversely, the reduction of the alternating and direct current components through the sector control windings connected to the increased-resistance electron discharge device greatly increases effectiveness of the opposed sectors.

Hence, control winding circuits 46, 47 and 48, 49 are made to produce two simultaneously cooperative control functions merely by application of a direct-current source and circuit resistance controlling apparatus.

If preferred, the magnetic saturation effect for differential control of clockwise and counterclockwise torque sectors may be effected without so direct an effect upon the impedance of the sector portions of the second-phase winding 41. This may be accomplished by further control windings 46' and 47' upon the first and third sectors and 48' and 49' upon the second and fourth sectors, respectively. These windings are provided with transpositions between successive teeth, so that successive teeth are looped in opposite senses. Hence, successive teeth are oppositely polarized by the action of differential direct currents through the circuits 46', 47' and 48', 49'. As a consequence of the alternate north and south polarization of successive teeth in each sector by these control circuits, the further control circuits including winding 46', 47' and 48', 49' are prevented from being electromagnetically coupled to either the first-phase alternating voltage winding 38 or the second-phase alternating voltage supply winding 41.

An arrangement 70 including a pair of electron discharge devices 71 and 72 is illustrated in Fig. 1 as connected for differential resistance control of the currents produced by a battery 73 through circuits 46', 47' and 48', 49', respectively. Discharge devices 71 and 72 have their cathodes connected together and to the negative terminal of the direct current source 73, whose positive terminal is connected to the junction of control circuits 46', 47' and 48', 49.' The control electrodes of the electron discharge devices 71 and 72 are connected to a voltage divider circuit embodying bridge-connected resistors 74, 76 and 77, the control electrode of device 71 being connected to the junction of resistors 74 and 77, and the control electrode of device 72 being connected to the junction of resistors 76 and 77. A grid bias source 78 is connected between the function of resistors 74 and 76 and the junction of the cathodes of the electron discharge devices 71 and 72. The conduction through discharge devices 71 and 72 may be differentially varied for the exertion of reversible control over the electromotive apparatus 17 either by the application of a reversible polarity controllable voltage between terminals 81 and 82 connected to the control electrodes of electron discharge devices 71 and 72, or by varying the setting upon resistor 77 of an intermediate tap 83 connected to the cathodes of the electron discharge devices 71 and 72.

It will be apparent that the arrangement 70 of electron discharge devices 71 and 72 is similar to the arrangement 60 of devices 63 and 64. Arrangement 70 is usable separately or simultaneously with liquid level switch 51 in the embodiment of Fig. 1; or it may be used simultaneously with the electronic arrangement 60 of Fig. 2, with the latter effective both as to saturation and as to impedance, for the differential control of the clockwise sectors I, III and the counterclockwise sectors II, IV of the electromotive apparatus 17. While the sharpest differential control of the oppositely directed sectors is achieved by the combined effects of electromagnetically-coupled impedance loading and saturation of the permeable teeth, either of these effects can be employed almost exclusively, as has been pointed out above. When the energy supply windings 38 and 41 of the electromotive apparatus are energized with polyphase supply voltages, actual torque components are developed within the portions of the rotor 18 adjacent the teeth of the respective sectors. Accordingly, any one of the four sectors I-IV, if isolated from the other three, would produce sustained rotation of rotor 18 if the rotor were free to rotate, or would produce a sustained appreciable torque in rotor 18 if the rotor were stalled, as by the excessive load resulting from gyroscopic stability where electromotive apparatus 17 is employed as a journal torque motor on a gyroscope system.

While the use of two counterclockwise sectors and two clockwise sectors, of substantially quadrantal extent, has been illustrated in Fig. 1, such an arrangement should be taken as merely illustrative. A satisfactory electromotive apparatus may be built with only one clockwise sector and one counterclockwise sector, or the apparatus may include as many pairs of opposed sectors as may be desired.

Moreover, while each of the control arrangements 51, 60 and 70 have been illustrated as designed for simultaneous and opposite effects upon the clockwise torque sectors I, III and the counterclockwise control sectors II, IV, it is obvious that control of the effectiveness of sectors directed in one sense only, e. g., of clockwise torque sectors I, III, may be employed for motor control over an appreciable range. Thus, the torque components of sectors I, III may be increased until they exceed the opposed torque components of sectors II, IV, or decreased until they are exceeded by the torque components of sectors II, IV. For most applications, however, the wide-range control flexibility afforded by opposite control of conductivity of the opposed-sector control windings is preferred.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. Controllable electromotive apparatus comprising a stator unit and a rotor unit pivoted for rotation about an axis with respect to said stator unit, means including an alternating voltage winding portion on one of said units for inducing a torque component in said rotor in a first direction about said axis, means including a further alternating voltage winding portion on one of said units for inducing a torque component in said rotor in the opposite direction about said axis, means simultaneously energizing said first and second alternating voltage winding portions for producing mutually opposed torque components in said rotor, and means including at least one further winding on said one of said units for differentially limiting the effectiveness of said first and second torque component inducing means for controlling the resultant torque in said rotor.

2. Controllable electromotive apparatus as defined in claim 1, wherein said means for differentially limiting the effectiveness of said first and second torque component producing means comprises a first control winding coupled to said first torque component inducing means, a second control winding coupled to said second torque component inducing means, and means for differentially controlling current conductivity through said first and second control windings.

3. Controllable electromotive apparatus as defined in claim 1, wherein said means for differentially limiting the effectiveness of said first and second torque component producing means comprises a first control winding coupled to said first torque component inducing means, a second control winding coupled to said second torque component inducing means, and means for passing differentially controllable currents through said first and second control windings.

4. Controllable electromotive apparatus comprising a stator unit, a rotor unit pivoted for rotation about an axis with respect to said stator unit, a first phase alternating voltage winding on one of said units, means including a further phase alternating voltage winding portion on one of said units cooperating with said first-phase winding for inducing a torque component in said rotor in a first direction about said axis, means including a further phase alternating voltage winding portion on one of said units cooperating with said first-phase winding for inducing a torque component in said rotor in the opposite direction about said axis, said means for inducing a torque component in the first direction and said means for inducing a torque component in the opposite direction being simultaneously operative to produce opposed torque components in said rotor, and means for differentially controlling the effectiveness of said first direction torque component inducing means and said opposite direction torque component inducing means, whereby the resultant torque induced in said rotor may be reversibly controlled by said effectiveness controlling means.

5. Controllable electromotive apparatus comprising: an alternating current motor having a rotor, a first alternating current winding, and a second alternating current winding including first and second portions connected in opposition, said first winding portion being arranged to cooperate with said first winding to produce rotor torque in one direction and said second winding portion being arranged to cooperate with said first winding to produce rotor torque in the opposite direction, said first winding portion being electromagnetically isolated from said second winding portion, and means for differentially controlling the first and second portions of said second winding to control the resultant rotor torque.

6. Controllable electromotive apparatus comprising cooperating rotor and stator elements, said stator element comprising a plurality of permeable teeth for directing magnetic flux into said rotor element, a first-phase alternating current winding cooperating with all of said permeable teeth for producing alternating flux paths thereamong, a second phase alternating current winding cooperating with all of said permeable teeth for producing alternating flux paths thereamong, a first portion of said second phase winding cooperating with the permeable teeth in a first sector of said stator element to produce a rotor torque component in a first direction and a second portion of said second phase winding cooperating with the permeable teeth in a second sector of said stator element to produce a rotor torque component in the opposite direction, and means for differentially controlling the first and second portions of said second phase winding to control the resultant rotor torque.

7. Controllable electromotive apparatus as defined in claim 6, wherein said means for differentially controlling the first and second portions of said second phase winding comprises a first control winding on the permeable teeth in said first sector of said stator element, a second control winding on the permeable teeth in said second sector of said stator element, and differential current control means coupled to said first and second control windings.

8. Controllable electromotive apparatus comprising an alternating current motor having a rotor and a pair of alternating current winding portions, means for energizing one of said winding portions with an alternating voltage to produce a rotor torque in a first direction, means for energizing the other of said winding portions with such alternating voltage as to produce an equal rotor torque in the opposite direction, and differentially-acting means for differentially varying the impedances of said winding portions to control the direction of the resultant torque produced by said motor.

9. Controllable electromotive apparatus comprising an induction motor including a conductive rotor and first and second alternating voltage windings, said second winding comprising two opposed portions, means for energizing said first winding with alternating current, means for energizing said second winding with alternating current displaced in phase with respect to the current through said first winding, the current through one portion of said second winding being effective to induce a torsional component in said rotor in one direction and the current through the other portion of said second winding being effective to induce a torsional component in said rotor in the opposite direction, and means inductively coupled to at least one of said portions for varying the torsional component thereby induced in said rotor.

10. Controllable electromotive apparatus comprising a stator unit, a rotor unit pivoted for rotation about an axis with respect to said stator unit, means including an alternating voltage winding portion on one of said units for inducing a torque component in said rotor in a first direction about said axis, means including a further alternating voltage winding portion on one of said units for inducing a torque component in said rotor in the opposite direction about said axis, means for simultaneously energizing said first and second alternating voltage winding portions to produce mutually opposed torque components in said rotor, and means for differentially limiting the effectiveness of said first and second torque component inducing means for controlling the resultant torque in said rotor, said means for differentially limiting the effectiveness of said first and second torque component producing means comprising a first control winding coupled to said first torque component inducing means, a second control winding coupled to said second torque component inducing means, direct current supply means connected to said first and second control windings, and means for differentially varying the current conduction through said first and second control windings.

11. Controllable electromotive apparatus as defined in claim 10, wherein said first control winding is electromagnetically coupled to said first alternating voltage winding portion for receiving an induced voltage therefrom, said second control winding is electromagnetically coupled to said further alternating voltage winding portion for receiving an induced voltage therefrom, and said means for differentially controlling current conduction through said first and second control windings comprises differentially variable conductor means for differentially controlling alternating currents through said control windings due to said induced voltages and simultaneously differentially controlling direct currents through said control windings due to said direct current source.

12. Controllable electromotive apparatus comprising an alternating current motor having a rotor and a pair of alternating current windings, means for energizing said windings with alternating current, said windings being so positioned and energized as to produce equal and opposite rotor torques, a pair of control windings inductively coupled respectively with said pair of alternating current windings, and means for differentially varying the induced current flow in said control windings whereby differentially to control the resultant torque produced by said motor.

13. Controllable electromotive apparatus comprising an alternating current motor including a movable element and a pair of opposed alternating current induction winding portions coupled thereto, means for energizing one of said portions to produce a force tending to move said element in one direction and for energizing the other of said portions to produce a force tending to move said element in the opposite direction, a further winding coupled to one of said winding portions, and means for controlling the flow of induced current through said further winding to effect differential control of said oppositely directed forces, said last-mentioned means including a direct current supply connected in circuit with said further winding.

ROBERT S. CURRY, Jr.

REFERENCES CITED

The following references are of record in the file of this patent:

UNITED STATES PATENTS

| Number | Name | Date |
| --- | --- | --- |
| 943,391 | Conrad | Sept. 14, 1909 |
| 1,448,902 | Shaffer | Mar. 20, 1923 |
| 1,710,755 | West | Apr. 30, 1929 |
| 1,779,302 | Winter | Oct. 21, 1930 |
| 1,877,605 | Shivers | Sept. 13, 1932 |
| 1,906,105 | Sandison | Apr. 25, 1933 |
| 1,966,170 | Greene | July 10, 1934 |
| 2,007,240 | Crosthwait | July 9, 1935 |
| 2,027,846 | Suits | Jan. 14, 1936 |
| 2,227,467 | Sweeny | Jan. 7, 1941 |
| 2,234,349 | MacKay | Mar. 11, 1941 |
| 2,284,649 | Grabau | June 2, 1942 |